United States Patent [19]
Bouyoucus

[11] Patent Number: 5,995,452
[45] Date of Patent: Nov. 30, 1999

[54] SYSTEM FOR GENERATING AND TRANSMITTING ACOUSTIC SIGNALS UNDERWATER

[75] Inventor: John V. Bouyoucus, Pittsford, N.Y.

[73] Assignee: Hydroacoustics, Inc., Rochester, N.Y.

[21] Appl. No.: 08/983,497

[22] PCT Filed: Jul. 29, 1996

[86] PCT No.: PCT/US96/12404

§ 371 Date: Jan. 16, 1998

§ 102(e) Date: Jan. 16, 1998

[87] PCT Pub. No.: WO97/06452

PCT Pub. Date: Feb. 20, 1997

[51] Int. Cl.[6] .............. G01V 1/02; G01V 1/04; G01V 1/157; G01S 15/00

[52] U.S. Cl. .......... 367/153; 367/144; 367/147; 181/111; 181/120

[58] Field of Search .................. 181/111, 120; 367/15, 23, 144, 147, 153

[56] References Cited

U.S. PATENT DOCUMENTS

| | | | |
|---|---|---|---|
| 4,170,002 | 10/1979 | Strange | 367/23 |
| 4,497,044 | 1/1985 | Silverman | 181/111 |
| 4,956,822 | 9/1990 | Barber et al. | 367/23 |
| 5,228,011 | 7/1993 | Owen | 367/147 |
| 5,535,176 | 7/1996 | Yang | 37/13 |

OTHER PUBLICATIONS

Dragoset, B., "A Comprehensive Method for Evaluating the design of Airguns and Airgun Arrays," Paper presented at the 1984 Offshore Technology Conference in Houston, Texas, May 1984.

*Primary Examiner*—Ian J. Lobo
*Attorney, Agent, or Firm*—M. Lukacher; K. Lukacher

[57] ABSTRACT

An array system, which provides a unipolar acoustic impulse with a broad spectral response underwater, utilizes a vertical array of airgun or electrical spark sources whose individual peak source strengths are essentially constant over the array length, but whose individual source periods vary with depth. The array of sources produces in each instance a near-unipolar, impulsive signature with a broad pedestal-like spectrum. The system may be used for underwater object location and also for seismic exploration.

11 Claims, 17 Drawing Sheets

ACOUSTIC OUTPUT FOR SINGLE AIR GUN AT 100 FT. DEPTH

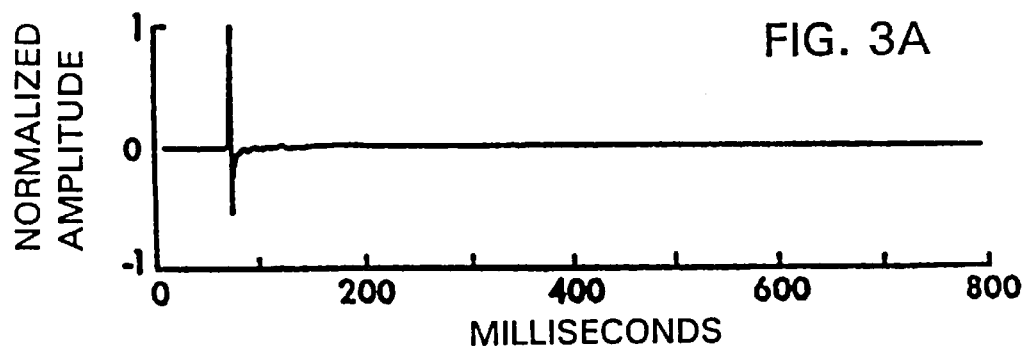
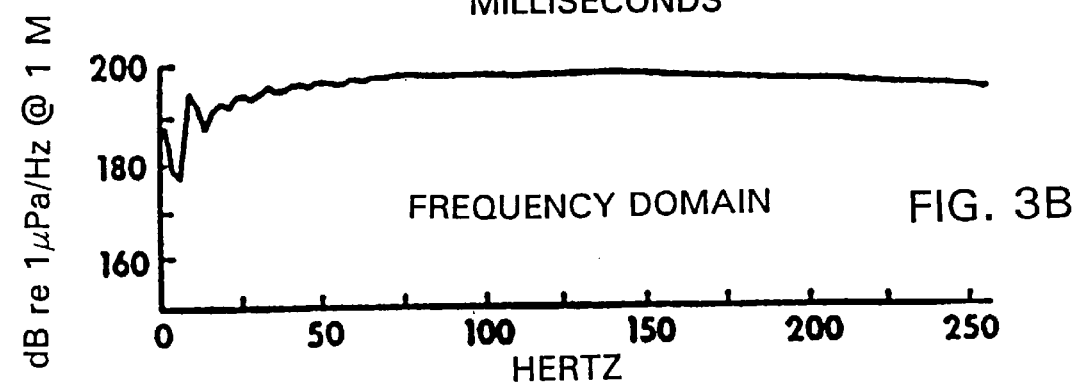
52.6 BAR-M (P-P), P/B RATIO 64.4:1
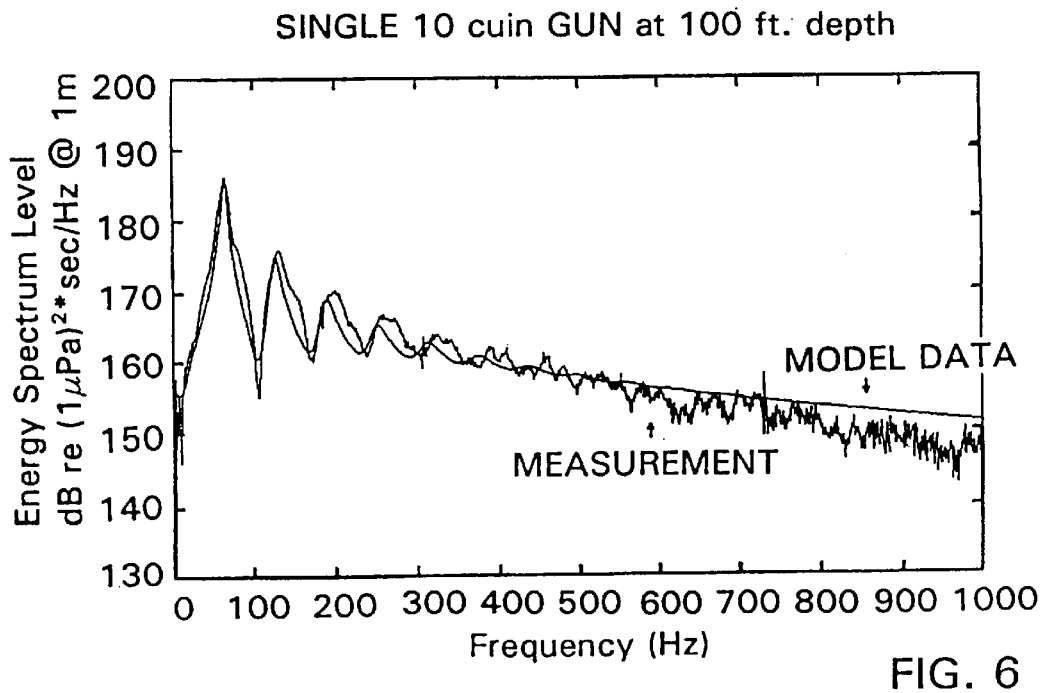

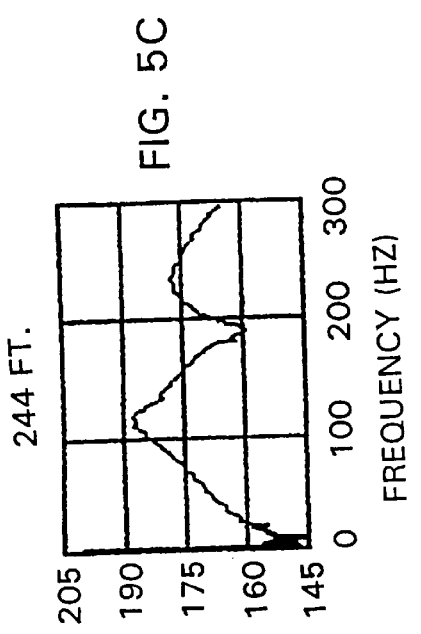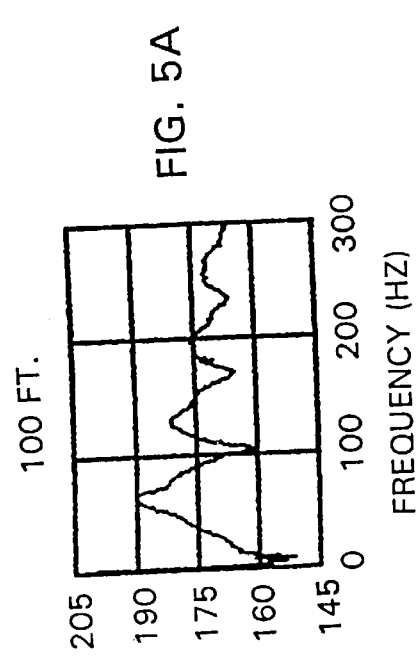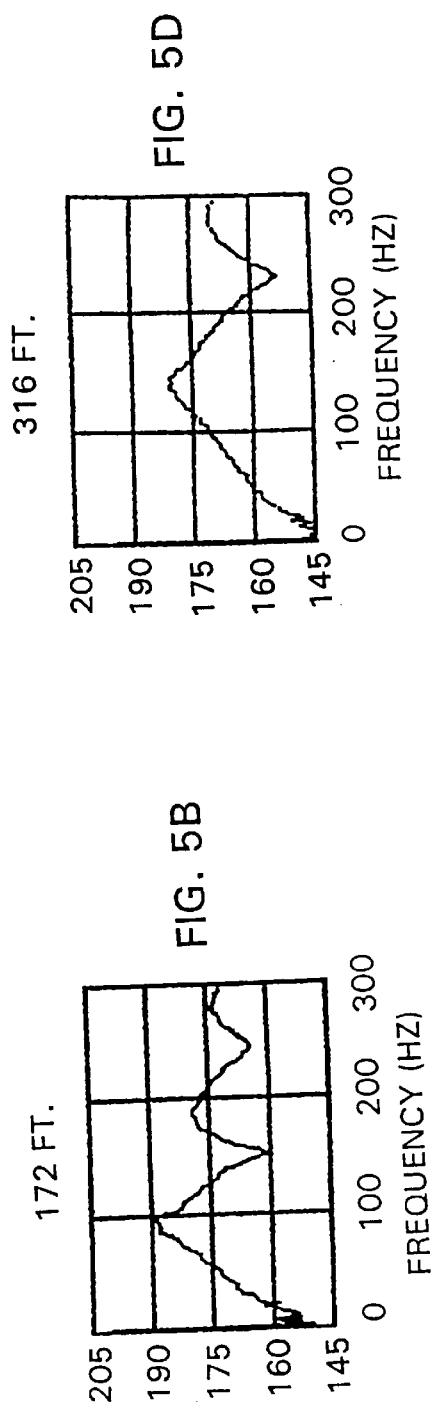

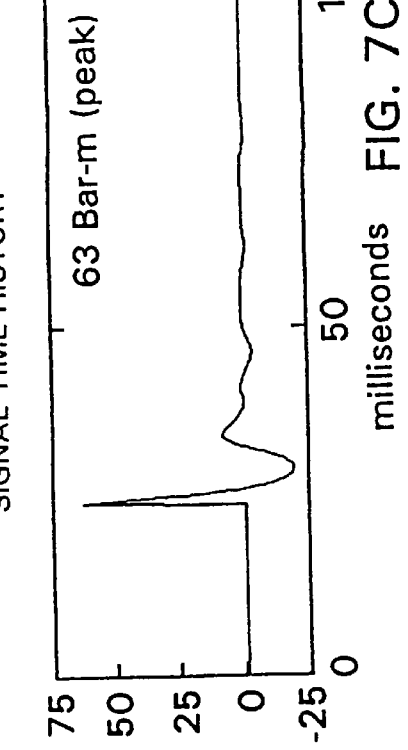
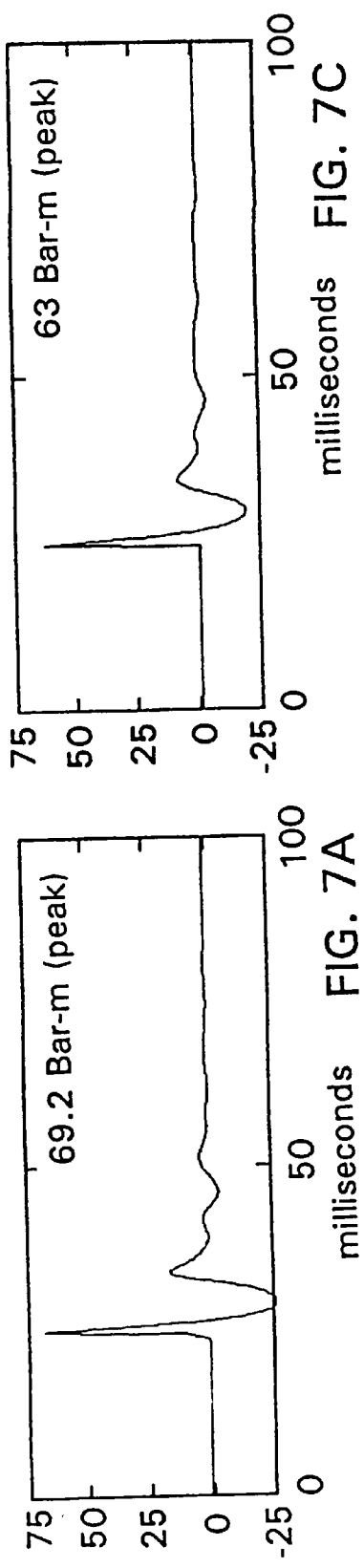
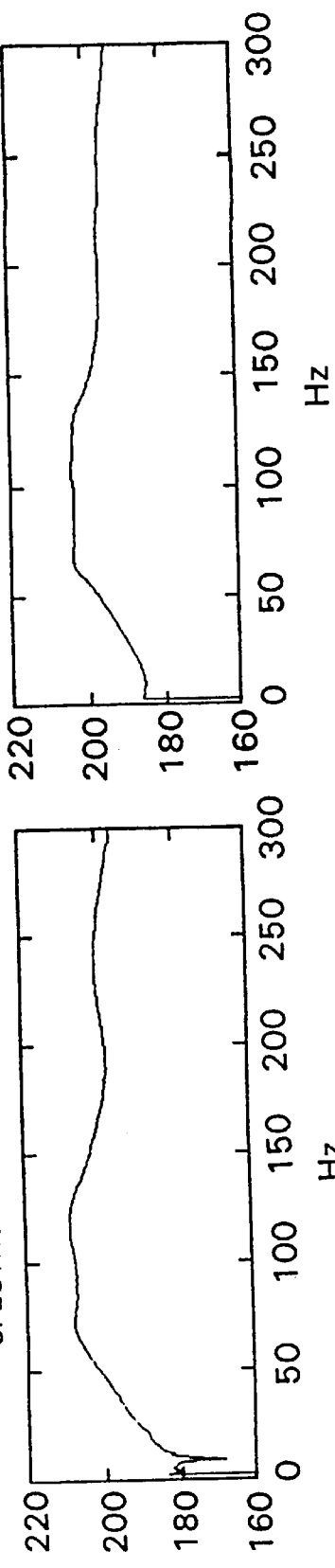
Energy Density Spectrum Level
dB re (1 μPa)²*sec/Hz at 1 m

INTERLEAVED ARRAY
(LF + MF)

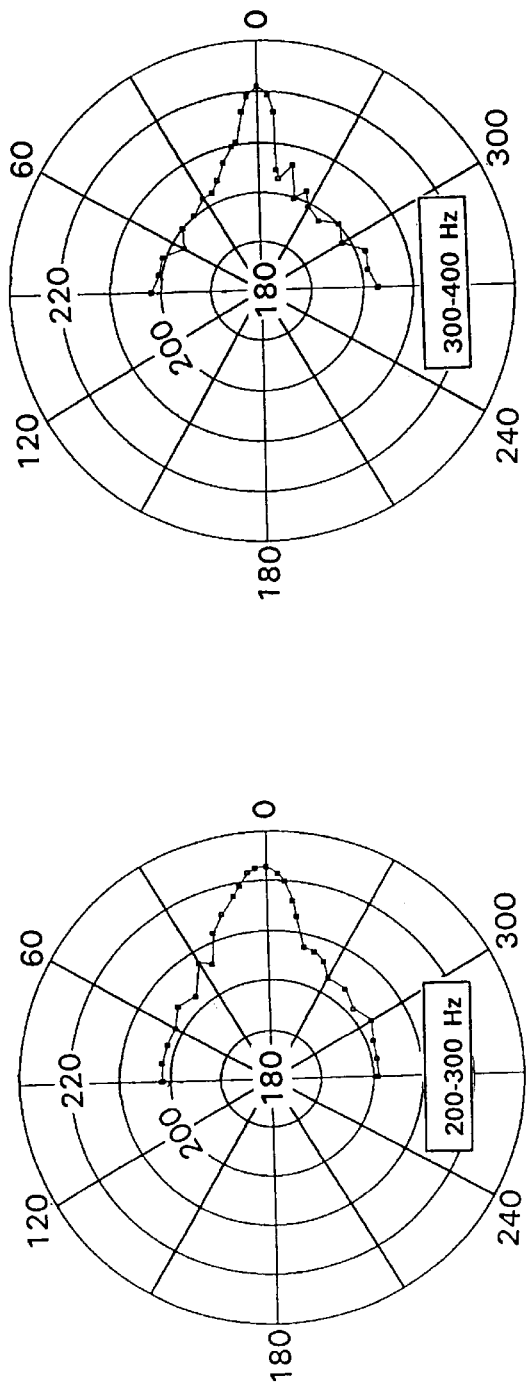
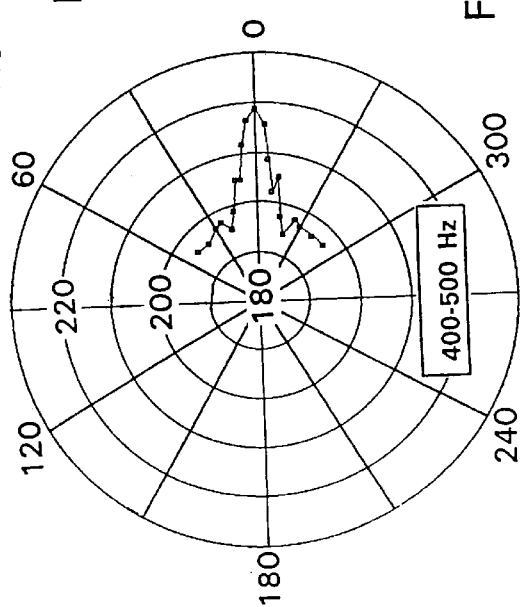
FIG. 10E
FIG. 10F
FIG. 10D
HF ARRAY (ONLY)

Pressure, kPa    msecs

Power Spectrum, dB    Hz

Pressure, kPa

Power Spectrum, dB

Pressure, kPa

Power Spectrum, dB

Pressure, kPa

Power Spectrum, dB

SYSTEM FOR GENERATING AND TRANSMITTING ACOUSTIC SIGNALS UNDERWATER

This application claims the priority benefit of pending U.S. provisional application Serial Nos. 60/001,802 filed Aug. 2, 1995; 60/001,947 filed Aug. 7, 1995 and 60/006,312 filed Nov. 7, 1995.

DESCRIPTION

The present invention relates to systems for generating acoustic or seismic signals in underwater environments, and particularly to air gun acoustic signal generating and transmitting arrays.

Air guns are well known in the field of marine seismic exploration. Such guns are commonly formed into large horizontal arrays that are streamed from a tow vessel at a fixed depth of 15 feet or so. Such arrays are used for projecting a coherent, time-aligned impulsive signal, of high energy content and broad spectral bandwidth, downwardly into the earth for the delineation of oil bearing strata.

The acoustic signature of typical air guns, such as shown in Harrison, U.S. Pat. Nos. 4,623,033 of Nov. 18, 1986 and/or 5,654,493 of Nov. 15, 1994, mounted near a water-air interface with the measurement made in the far field below the gun, consists of an impulsive event followed by a rapidly decaying wave train, as illustrated in FIGS. 1 A & B. The positive-going impulse, produced by the explosive release of compressed gas, is quickly followed by a mirror-like negative impulse arising from the pressure-release surface reflection. This impulsive-pair is followed by a decaying oscillatory tail which arises from the resonant, decaying oscillation of the residual gas bubble.

The resonant frequency of this gas bubble oscillation is given by:

$$f_c = \frac{55(14.7 + 0.444d)^{5/6}}{(P_c \cdot V_c)^{1/3}}$$

where:
 $f_c$=Bubble resonant frequency (Hz)
 d =Depth in feet
 $P_c$ =Gun cavity pressure
 $V_c$ =Charge cavity volume
(See FIG. 2.)

The spectrum of the event, also depicted in FIG. 1B, consists of a relatively narrow spectral peak associated with the fundamental bubble resonant frequency followed by lower level harmonic contributions.

This spectrum by itself is inadequate to yield the resolution required for seismic exploration. Accordingly, investigators in the field have developed long arrays of air guns with each gun (or gun group) having a different volume of compressed air so as to distribute the resonant frequencies of the guns over a wide frequency range. The peaks and valleys of the spectra of the multiplicity of guns are then distributed by design to help flatten the composite spectrum of the array of guns. Since guns of different volumes have different spectral levels, groups of guns are incorporated to establish the final flattened spectrum. This flattened spectrum is associated with a singular impulse cycle, as shown in FIGS. 3 A & B, and becomes useful for broadband high resolution geophysical prospecting.

Reference may be had to the following U.S. Patents for information concerning such horizontal arrays: Huizer, 4,727,956 of Mar. 1, 1988; Williams, 4,955,952 of Sep. 11, 1990; French, 4,254,480 of Mar. 3, 1981; Ray, 4,441,174 of Apr. 3, 1984; Brock, 3,437,170 of Apr. 8, 1969; Mott-Smith, 3,893,539 of Jul. 8, 1975; White, 4,372,420 of Feb. 8, 1983; Ruehle, 4.382,486 of May 10, 1983; Ongkiehong, 4,486,864 of Dec. 4, 1984; Desler, 4,718,045 of Jan. 5, 1988; Dunbar, 4,868,793 of Sep. 19, 1989; Garrotta, 4,914,636 of Apr. 3, 1990; and Duren, 5,281,773 of Jan. 25, 1994.

In the field of underwater detection of submerged objects at long horizontal ranges in a deep water column, it has been found useful to deploy a vertical line array of sources, long enough to possess vertical directivity to assist in the delineation of the submerged object from surface and bottom reflections (reverberation).

It has been discovered, in accordance with the invention, that one can use a vertical line array of air guns for the purpose of flattening the spectrum and that, instead of requiring a distribution of air gun volumes to distribute the resonant frequencies of the individual guns as is done in horizontal arrays for seismic exploration, the desired distribution of resonances can be obtained from the distribution in depth of guns of the same or essentially similar volumes.

It has further been found through model studies and measurements that the peak output of a properly designed air gun of a given, fixed volume is relatively constant over a sizable depth range (e.g., 100 to 400 feet), even though its bubble resonant frequency varies with depth. As stated above, air guns of different volumes (all at the same supply pressure and depth) will exhibit not only different resonant frequencies, but also different peak outputs.

Accordingly, a key feature of the invention is that a vertical array of air guns of constant or similar volume will provide an array of constant peak amplitude sources. This simplifies and aids in the array design for control of beam patterns, especially in the high frequency regime where the contribution of bubble resonances is reduced and the primary output arises from the initial impulse event. In arrays with guns with a distribution of volumes, design of the array is more difficult than with constant volume guns, since the design is complicated by the need to compensate for small volume guns which have less output then large volume guns. In addition, such groups of smaller guns lead to additional complexity, increased mounting and air connection hardware, and increased drag. This may not be a particular problem for horizontal arrays, since more horsepower can be used by the tow ship for maintaining a desired speed and rate of area coverage. However, for a vertical array, such additional complexity and resultant drag creates increased array tilt. For uniform azimuthal search the array cannot be deformed appreciably from the vertical. Thus such complexity tends to compromise search rate, and may require correction as by the addition of cumbersome dead weight at the bottom of the array which can add significantly to the size and cost of the array handling system.

In summary, the invention is based upon the discovery that vertical arrays containing air guns having identical or similar air volumes can exhibit essentially constant peak output as a function of depth while, at the same time, having a bubble resonance that is a function of depth, increasing as depth increases. The constant peak output contributes to a beam patter at the higher frequencies that is symmetrical about an axis normal to the vertical axis of the array. At the lower frequencies, the bubble resonance distribution for an array of constant volume guns creates a broad, flat pedestal which is elevated some 5 to 6 dB above the higher frequency output. This broadband pedestal energy is useful for object detection and localization at extended ranges, and its flat spectrum is beneficial for high range resolution and for the suppression of clutter.

In a preferred embodiment, a vertical array of equal or similar size air guns provide a transmitted signal on axis that is characterized by a coherently generated singular broadband, impulsive event and with a spectrum which exhibits a broad pedestal-like response. The oscillatory nature of the signature and spectrum of any individual gun is smoothed in the array by the spreading of the periods of these individual gun signatures due to the dependance of such signature periods on depth (on ambient pressure).

Further in accordance with the invention two or more vertical arrays of air guns, each array comprised of guns of fixed volume, with the volume being different for each array, exhibit pedestals that have different frequency bands. For a given, common depth range, such arrays may be merged to yield a composite spectrum which exhibits a constant flat level, broader in frequency bandwidth than for any of the individual arrays, and which can have a smooth joint at the junction of the several bands.

It has been found, in accordance with another aspect of this invention, that electrically controlled underwater spark discharge sources exhibit characteristics similar to air guns.

FIGS. 12 and 13 show the character of an underwater spark discharge and its spectrum at a depth of 188 feet. The total event consists of two (or more) impulses separated by a relatively long rarefaction interval.

The initial spike-like event is associated with the impulsive formation of a steam cavity as a result of the heat energy introduced in to the medium by the electric discharge. The steam cavity grows in size and eventually collapses to create the second impulse event. The steam condenses to form water during the collapse cycle, and the event-pair may be the characteristic signature.

The spectrum of the event-pair signatures is shown in FIG. 13. This spectrum has a relatively broad main lobe followed by a decaying succession of narrower lobes.

The period, T, in seconds between the main impulse events is given by the expression below where p is the density of the water in kilograms per cubic meter; E in energy in Joules, and $P_{ave}$ is the average ambient pressure of the water acting on the source in Pascals.

$$\tau = 1.83 \left(\frac{3}{4\pi}\right)^{\frac{1}{3}} \rho^{\frac{1}{2}} \left(\frac{E^{\frac{1}{3}}}{P_{ave}^{\frac{5}{6}}}\right)$$

This period is proportional to the one-third power of the discharge energy, and is inversely proportional to the 5/6 power of the ambient pressure.

Accordingly, a vertical array of sparker electrodes, fired simultaneously with roughly equal energies, will appear as an array of events with dispersed periods, creating a broadened spectrum as has been shown with the air guns.

In accordance with this object of the invention, it has been found that a plurality of electric spark discharge units (also known as sparkers) may be arranged in a vertical line array for the purpose of flattening the spectrum of the acoustic or seismic signal produced by the array and that, instead of requiring a distribution of sparkers operating at different energies, the desired distribution of impulse events can be obtained from the distribution in depth of the sparkers which provide the same or essentially similar energy spark discharges.

Accordingly, a key feature of this aspect of the invention is to provide a system comprising a vertical array of sparkers, electrically controlled to produce underwater spark discharges of the same energy, or approximately like energy at selected depths to generate and transmit acoustic or seismic signals having a broad and essentially flat spectral response useful for object detection and localization at extended lateral ranges as well as for seismic exploration to project a coherent impulse signal of high energy content and broad spectral bandwidth downwardly into the earth for the delineation of oil bearing strata and other geo-physical characteristics.

The foregoing and other objects, features and advantages of the invention will become apparent from a reading of the foregoing and following description in connection with the accompanying drawing in which FIGS. 1A and B are plots illustrating the acoustic time-signature and spectrum of an air gun at a 2- foot depth, including the effects of surface reflections;

FIG. 2 are plots of air bubble resonant frequency variation with depth for air guns of different volumes;

FIGS. 3A and B are respectively plots of the impulse and frequency response of a prior art horizontal air gun array;

FIGS. 4A to D are plots of the waveform or time history of the signal from a single air gun at different depths;

FIGS. 5A D are plots of the spectral response of the signal generated by the gun at different depths;

FIGS. 6 is a plot comparing the measured energy spectrum of a 10 cubic inch air gun at 100 ft. depth with an analytical model prediction of that performance.

Figure 22:
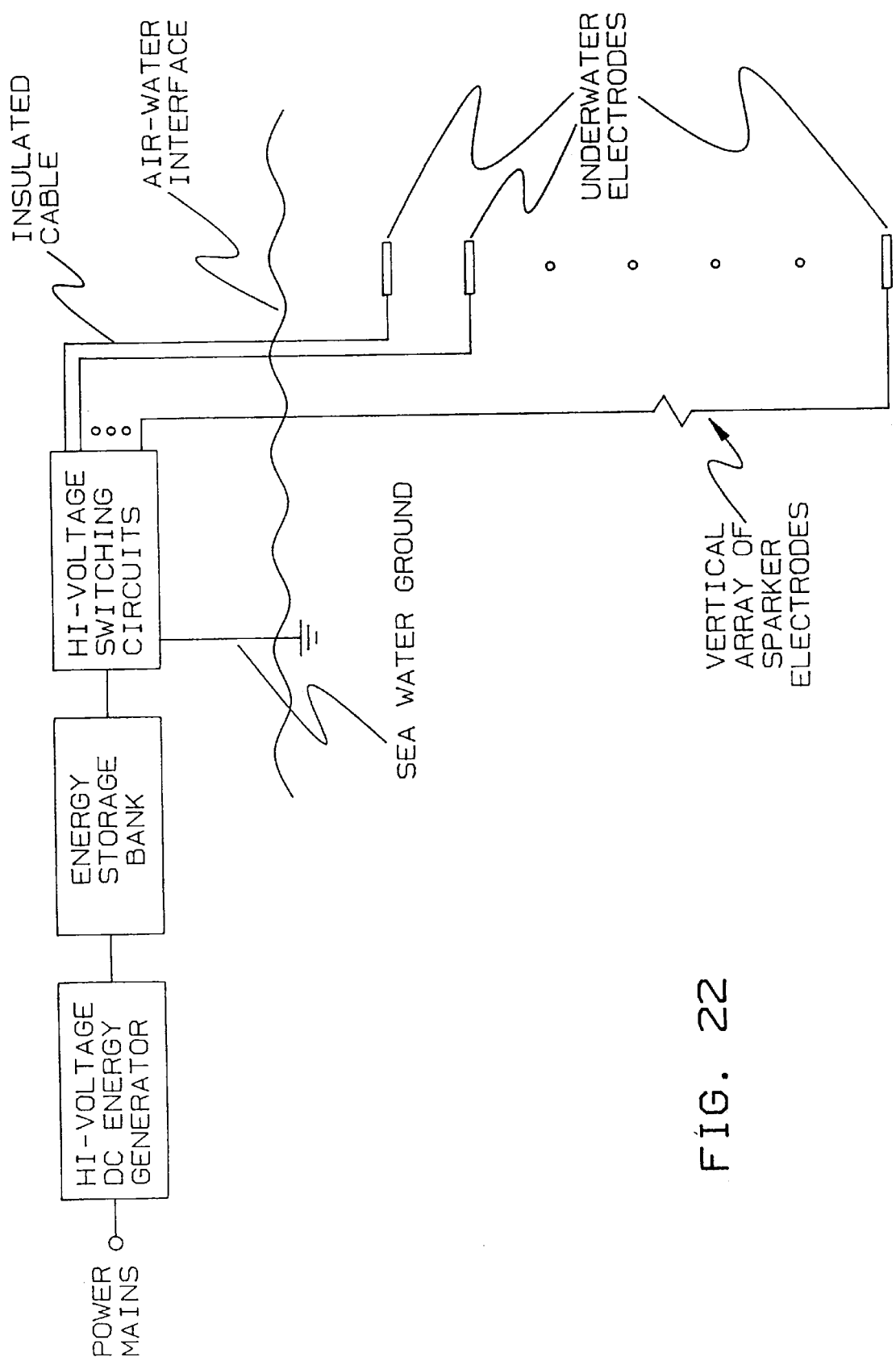

FIGS. 7A to D are plots illustrating the time history and spectral response of a vertical array of 46, 10 cubic inch air guns, in accordance with an example of the invention. The plots of FIGS. 7A and 7B are based upon data which are exemplified in the plots of FIGS. 4A–D and 5A–D. FIGS. 7B and 7C are from an analytical model of the vertical array of 10 cubic inch guns;

FIG. 8 is a schematic diagram of an interleaved compound vertical array of air guns having two sub-arrays of guns, each subarray consisting of guns of equal volume but with the volumes of the guns between the sub-arrays being different;

FIGS. 9A and B are plots of the time history and spectral response of the arrays shown in FIG. 8;

FIGS. 10A to F are beam patterns of the array shown in FIG. 8;

FIG. 22 is a block diagram of a system according to the invention.

Referring to FIGS. 4A to D and 5A to D, the measured characteristics are illustrated for a 10 cubic inch gun of the type in the above referenced Harrison patents.

The gun time-history and spectral characteristics are shown for selected depths of 100, 172, 244 and 316 feet. The time history (FIG. 4A–D) is characterized by a sharp impulse, tightly coupled in timing to the firing signal, followed by a decaying bubble oscillation whose frequency increases with increasing depth. The corresponding spectral characteristics of the shots of FIG. 4A–D are illustrated in FIGS. 5A–D. As can be seen, the primary spectral peak moves from just above 50 Hz at 100 feet to just below 150 Hz at 316 feet. Thus, an adequately populated, vertically distributed array of such guns, in accordance with the invention, will exhibit a stagger-tuned, broadband spectral pedestal created by the sweep-out of the primary spectral peak as gun depth increases.

Referring to FIG. 6, the use of an analytical model in defining single gun performance is shown. Specifically FIG. 6 shows a broadband comparison of model prediction and measurement for the single 10 cubic inch gun at 100 foot depth. Agreement is good, at least out to 500 Hz.

FIG. 7A and B show the impulse time history and spectral response, respectively, projected for a vertical array of 46 10- cubic inch air guns, according to the invention, and based on single gun measurements. The agreement with an analytical model of this array is shown in FIG. 7C and D.

Gun-to-gun interactions are not included above. Such interactions for 10 cubic inch guns should be negligible for spacings larger than 5 feet or so, and may amount to a reduction of several dB in pedestal amplitude at spacings on the order of 2 to 3 feet.

Interaction measurements between guns made at depths of the order of 100 feet have shown that interacting clusters of, say, two to four guns at gun-to-gun spacings of approximately one to three feet can create unique spectral characteristics not evidenced by a single gun alone. Spaced vertical arrays of such gun clusters can then provide a flat, extended spectrum with a single impulse acoustic signature, but with the spectrum covering a different frequency band than is obtained if all the guns were spaced apart at non-interacting (or mildly interacting) distances.

Figure 8:
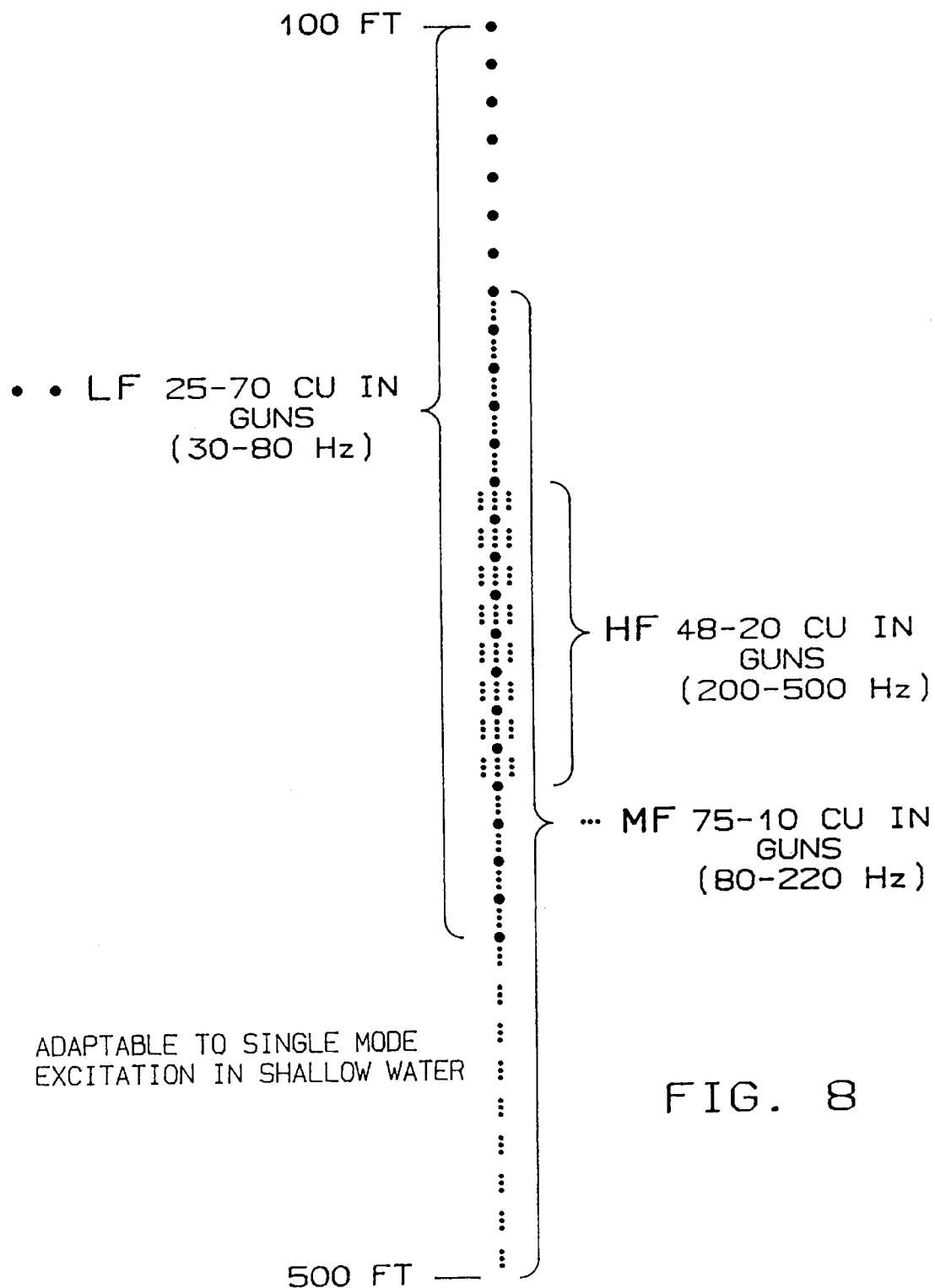

An interleaved compound array is shown in FIG. 8. This array is to provide a high source level transmission (which may be repeated to provide a rapid sequence of such shots) for long range, shallow water detection of moving objects and for the concomitant suppression of reverberation. The array consists of three subarrays that overlap and are interleaved. The first subarray is the LF or Low Frequency array comprised of 25–70 cubic inch guns covering roughly the 30 to 80 Hz frequency range (when the top of the array is at 100 feet submergence). This array is about 300 feet long. The second subarray is the MF or Mid Frequency array consisting of 75–10 cubic inch guns covering the 80 to 200 Hz range. It is also 300 feet long, but starts at 200 feet below the surface. The third array is the HF or High Frequency array which is placed over the center 100 feet of the interleaved array, and uses 48–20 cubic inch guns working in combination with the 24–10 cubic inch guns located in the same aperture.

The array as shown is useful for water depths in excess of 200 meters, where the lowest frequencies may be necessary. An array may also be constructed out of 50 to 100 foot segments of the array of FIG. 8, with such shorter apertures of low and/or high frequency capability individually deployed in water depths of 100 meters plus or minus to meet specific propagation characteristics.

The array of FIG. 8 is also adequately populated so that it can be fired in a shaded distribution to excite single-mode propagation in ducted channels. In contrast with most other transduction technologies, an air gun not fired in an array acts as a rigid body and will have minimum interaction with guns selectively fired. This leads to wide flexibility in the array's application to special needs.

Figure 9A:
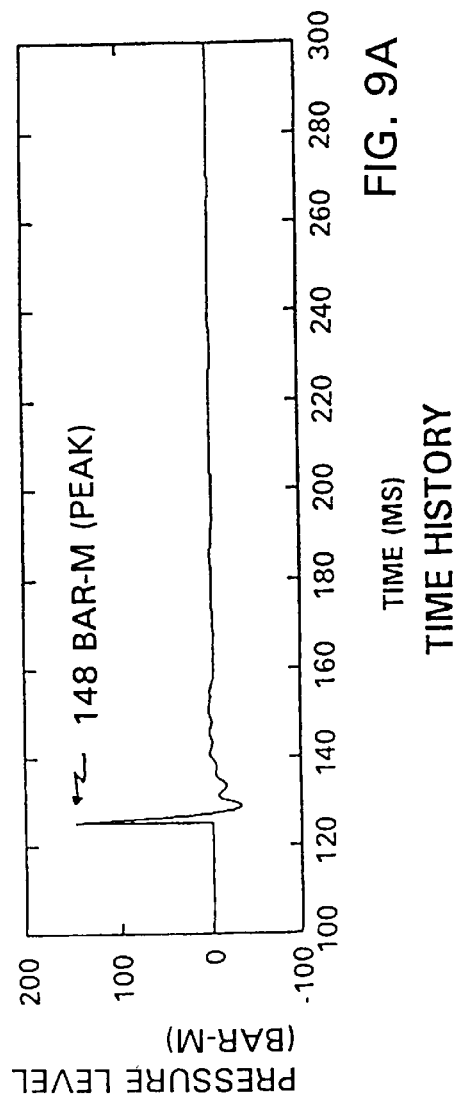
Figure 9B:
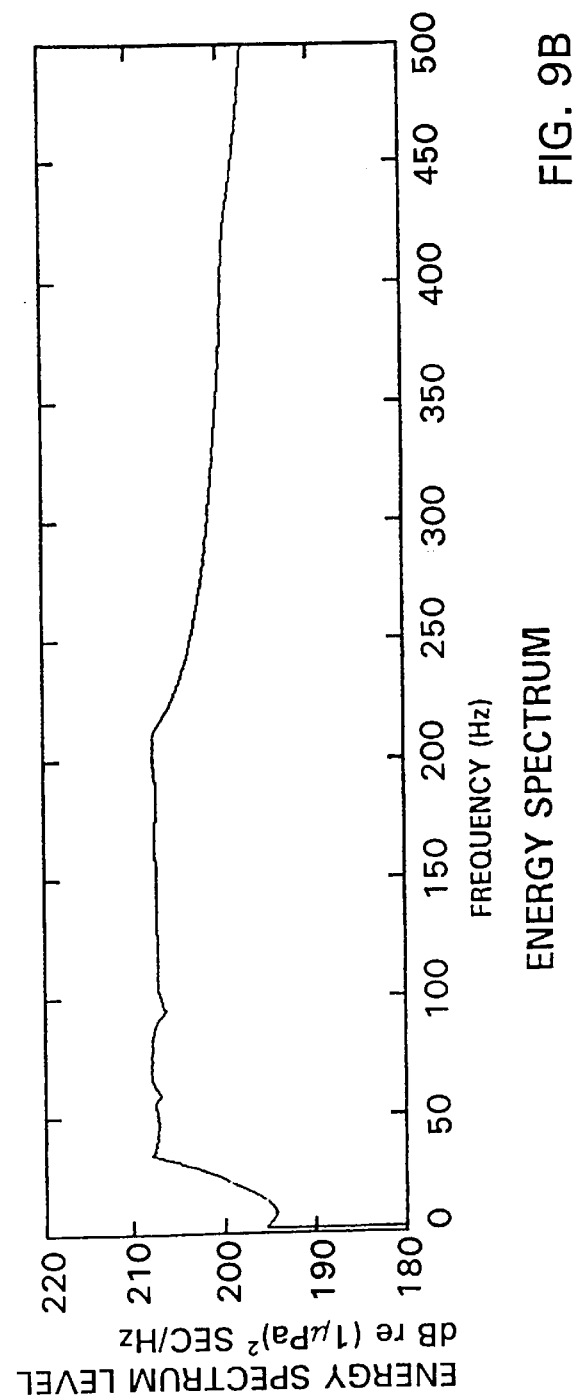

FIGS. 9A and B illustrate the interleaved LF and MF composite performance, based upon analytical modeling. The time waveform (FIG. 9A) is a single impulse, and the pedestal of the spectrum (FIG. 9B) extends from about 30 Hz to 220 Hz, gradually dropping off above that frequency. The overall transmission is characterized by a near-unipolar, impulsive signature with a flat pedestal-like spectrum. The notch at about 100 Hz is the joint between the 70 cubic inch LF array and the 10 cubic inch MF array. The architecture of the gun layout in the interleaved configuration provides the smooth transition between the LF and MF arrays. The HF array by itself provides a smooth spectrum above 200 Hz not unlike that shown in FIGS. 9A and B, but the shorter array length is necessary for reasonable vertical beam widths at the higher frequencies.

Figure 1A:
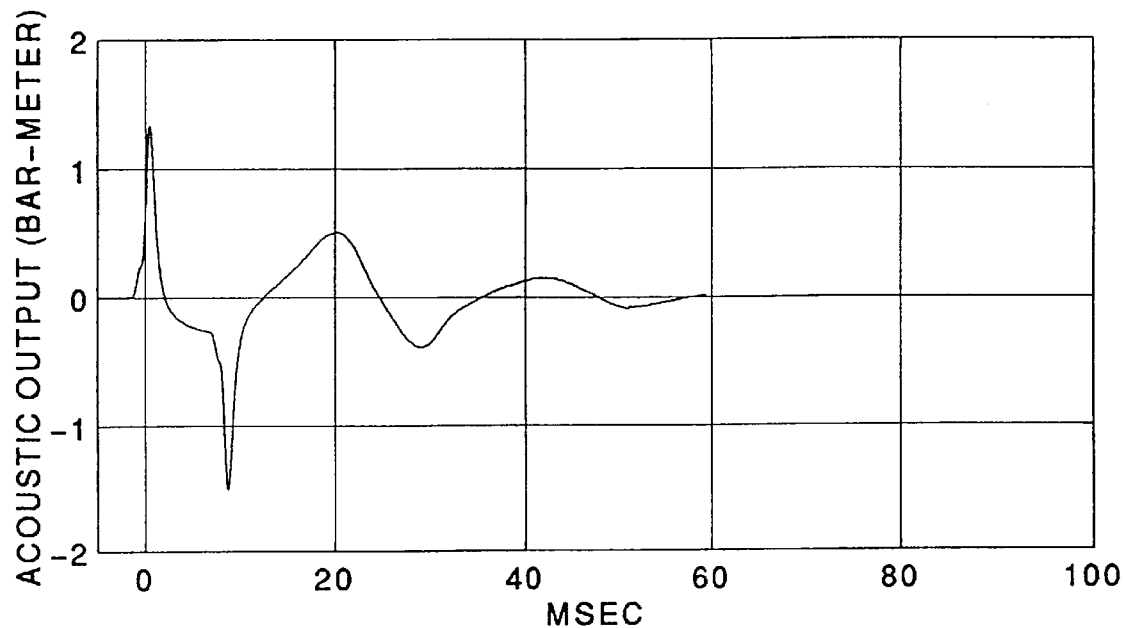
Figure 1B:
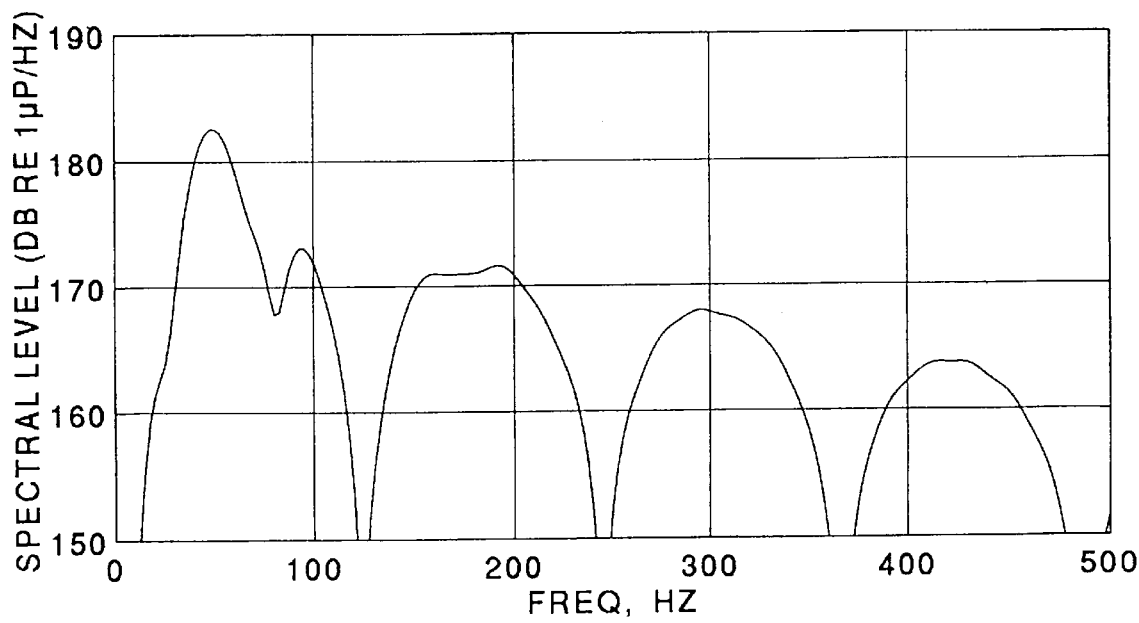
Figure 2:
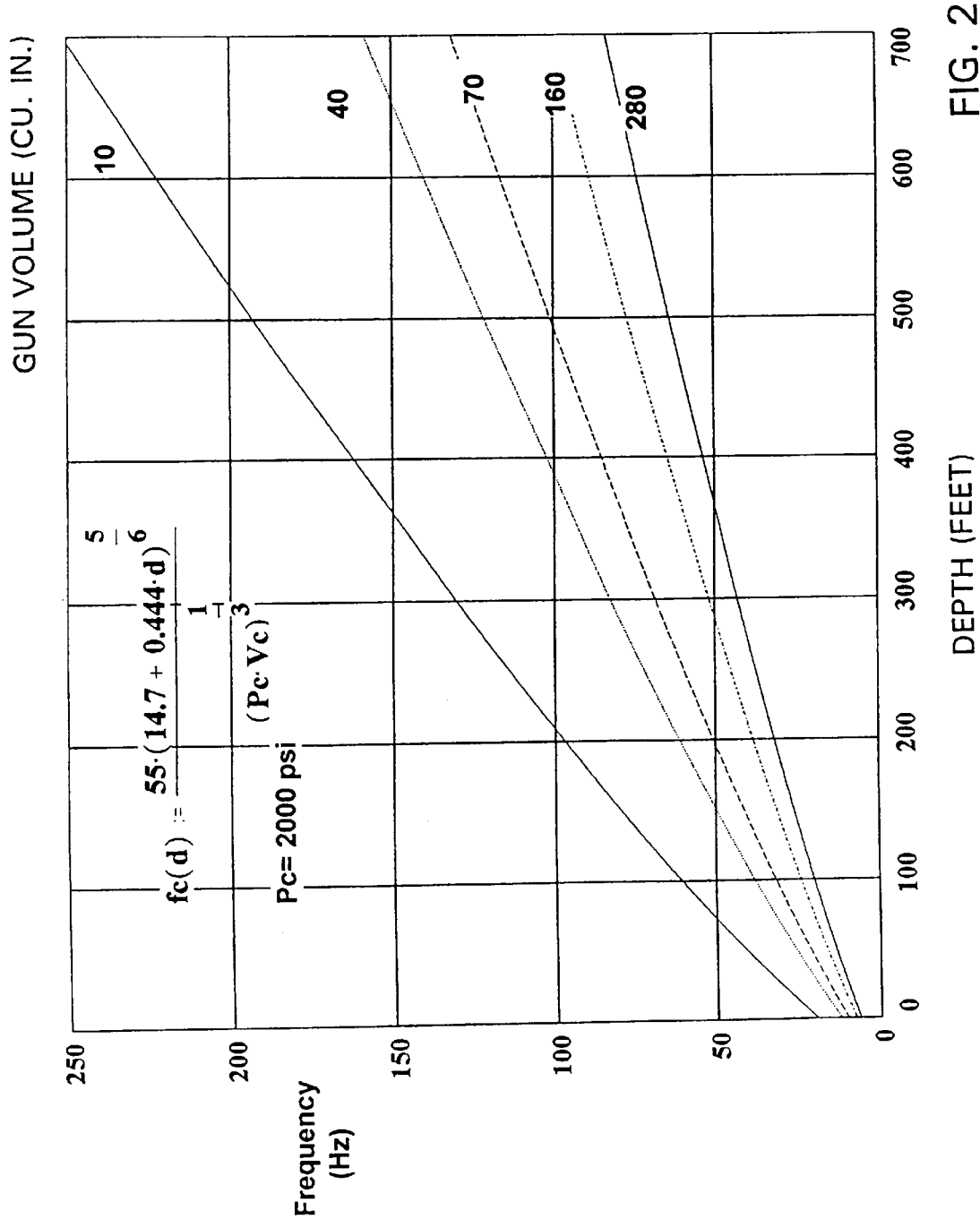
Figure 4A:
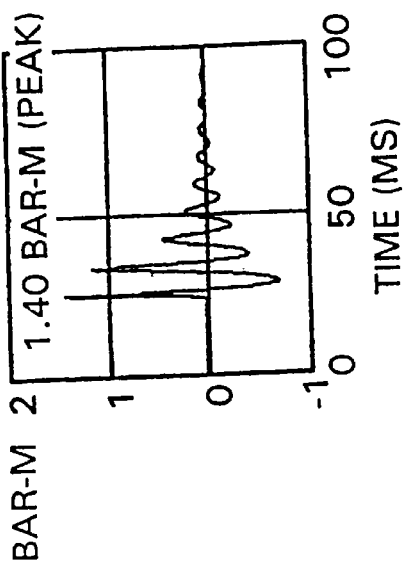
Figure 4C:
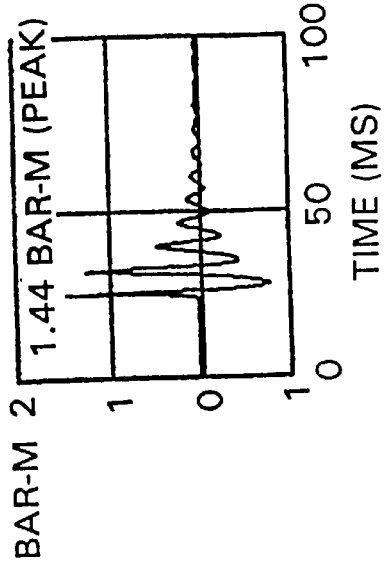
Figure 4B:
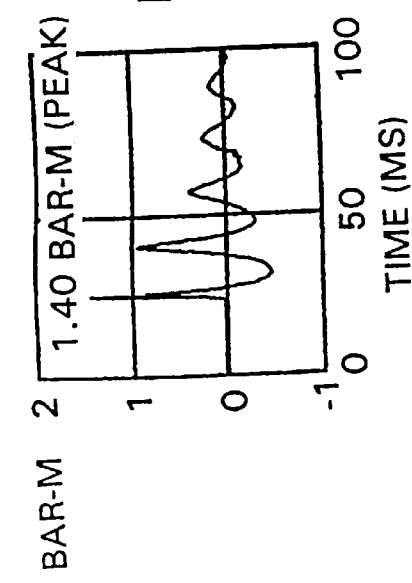
Figure 4D:
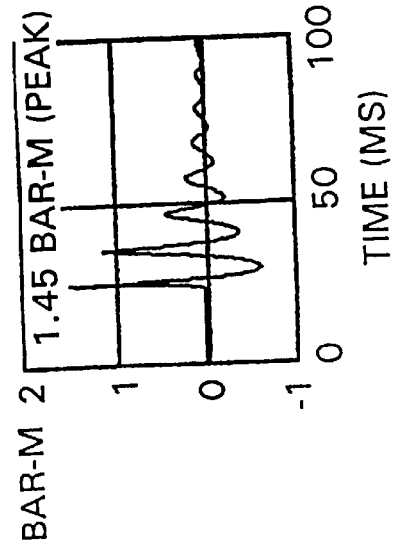
Figure 10B:
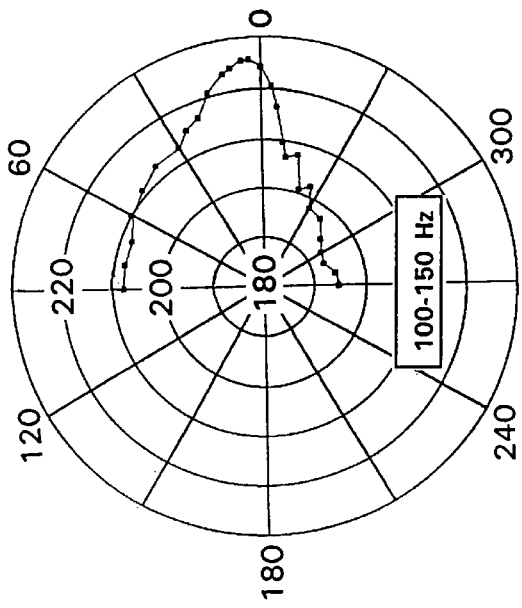
Figure 10C:
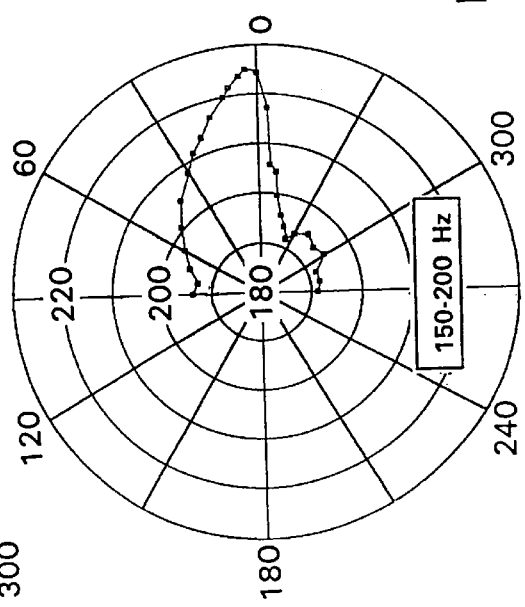
Figure 10A:
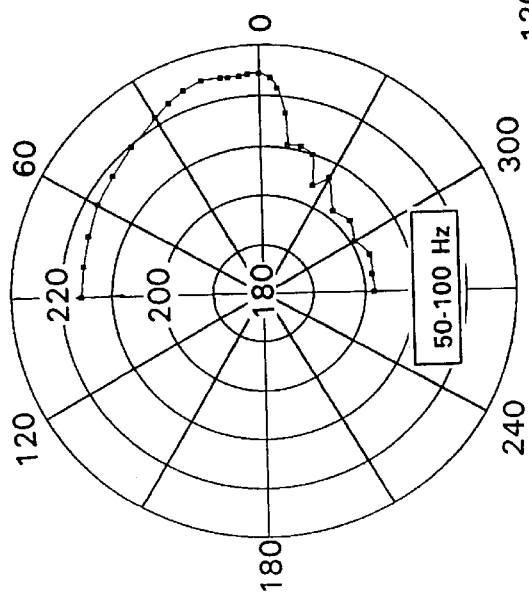

Beam patterns from the analytical model are shown in FIGS. 1OA–F for the interleaved (LF and MF) array (FIGS. 10A–C) and the high frequency (HF) array only (FIGS. 10D–F). The plots show band energy levels as a function of vertical angle for the frequency bands identified in the box in each of FIGS. 10A–F.

In the case of the LF and MF arrays the pedestal is dominating the output, and the stagger-tuning along the vertical line leads to asymmetry in the vertical beam patterns, with an effective upward tilt of the main response by about 7 degrees. This can be corrected by beam steering. The HF array operates above the pedestal region, and the patterns are more symmetrical. The main axis band energy levels differ by only 5 dB or so from the lowest (50–100 Hz) to the highest (400–500 Hz) band.

By firing the complete array repetitively with a timed sequence of shots spaced, say, at about 1 second intervals, the total band energy can be increased by 10 log N where N is the number of shots in the sequence. In this manner an increased total energy can be placed on the object to be detected and signal processing can properly collect the reflected energy in the sequence of returns to increase signal-to-noise ratios. Signal processing can also take advantage of the sequence of shots to distinguish a moving object from stationary clutter or reverberation.

Although the prior description has focussed on a vertical array with transmissions launched generally in the horizontal plane, the vertical array may also be fired with its main beam at any angle of elevation or depression by controlling the timing of the individual firing events. In particular, the array can be fired "end-fire" to launch a directional, broadband impulse vertically downward.

Figure 11:
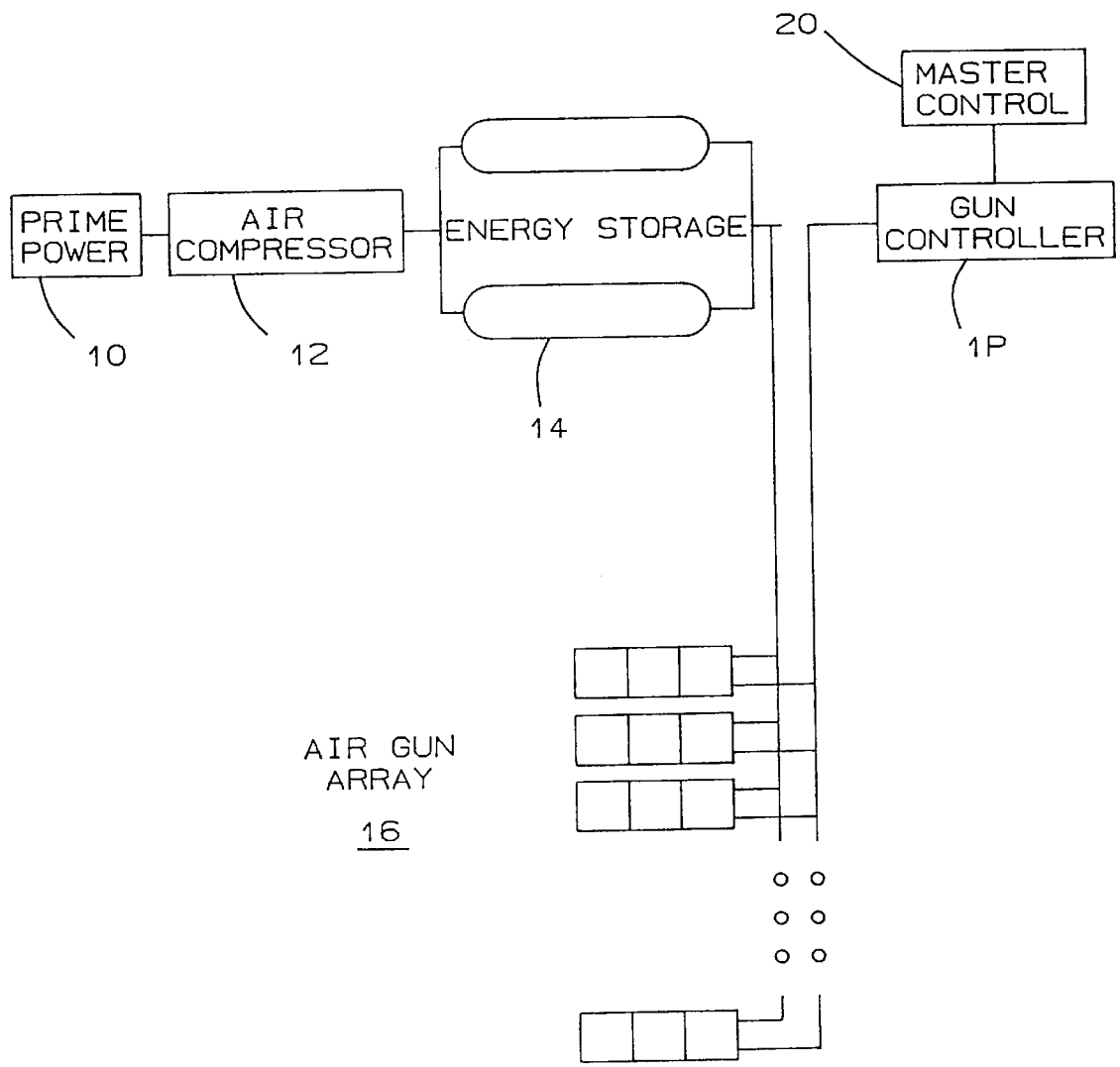
FIG. 11 is a schematic diagram of an acoustic or seismic signal generating and transmitting system incorporating a vertical array such as shown in FIG. 8, the system being in accordance with the present invention.
Figure 12:
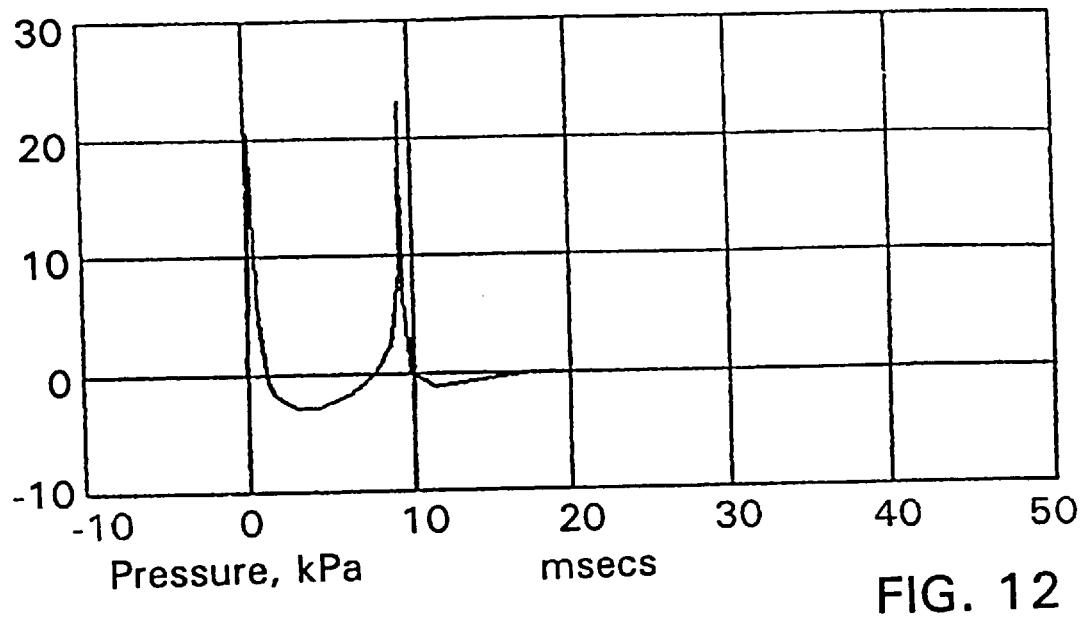
FIG. 12 is a plot showing the acoustic time signature of an exemplary underwater spark discharge event.

A system incorporating the invention including the power and control elements is shown in FIG. 11 Compressed air provided by compressor 12 driven by a motor (prime power) 10 is fed to gas storage bottles 14 that, in turn, feed the peak energy for the sequence of transmissions from the gun array 16. The gun array is, in turn, controlled by a master control 20 and a gun controller 18 that receives feed back from the timing coil of each gun and adaptively refines the timing accuracy of each shot.

The several subarrays may be controlled for firing off a sequence of shots used for target (velocity) detection and reverberation suppression. A typical compressor size (capacity) is 300 HP.

Referring to the aspect of the invention where the impulsive events are obtained from sparkers, it can be seen from FIGS. 14–17 that the period between the electric discharge event and the cavity collapse reduces with increasing depth and the frequency of the spectral peaks increases with increasing depth.

An array of such sparkers, distributed vertically and fired simultaneously will, accordingly, yield a large initial pulse followed by a sequence of smaller pulses distributed in time. The sequence of smaller pulses arises from the time-spaced distribution of cavity collapse events due to the distribution in depth of the sparker devices. If N is the number of events, the magnitude of the composite pulse on the axis normal to and bisecting the center of the array should be NA, where A is the amplitude of the individual sparker initial event. This is illustrated in FIG. 7 for an array of 23 sparkers spaced 8 feet apart, and extending over the depth range from 100 to 276 feet.

Figure 13:
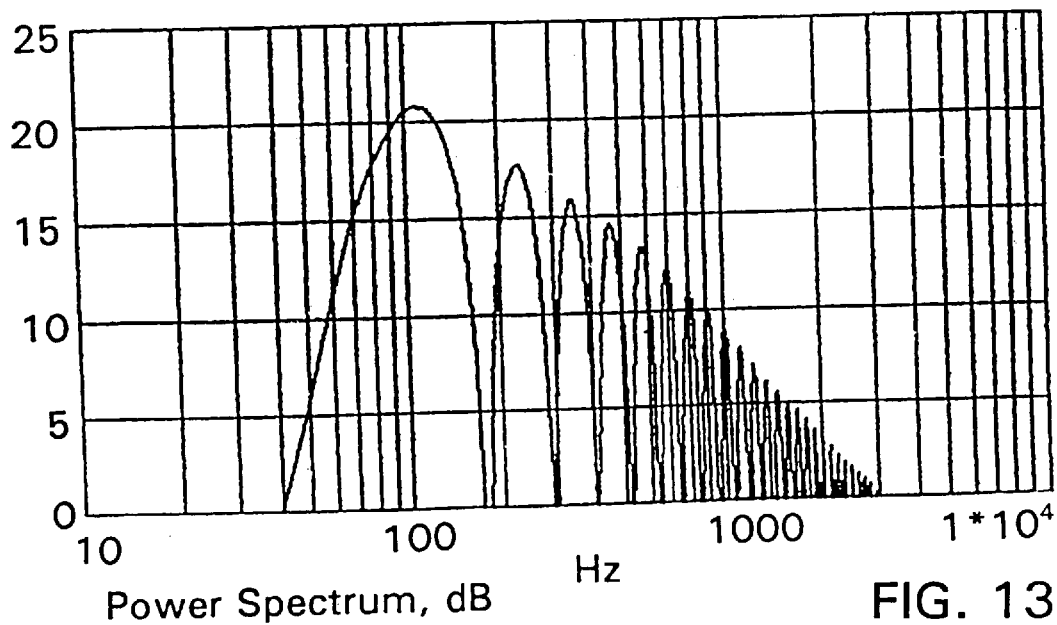
FIG. 13 is a plot showing the power spectrum of the signature of FIG. 12.
Figure 14:
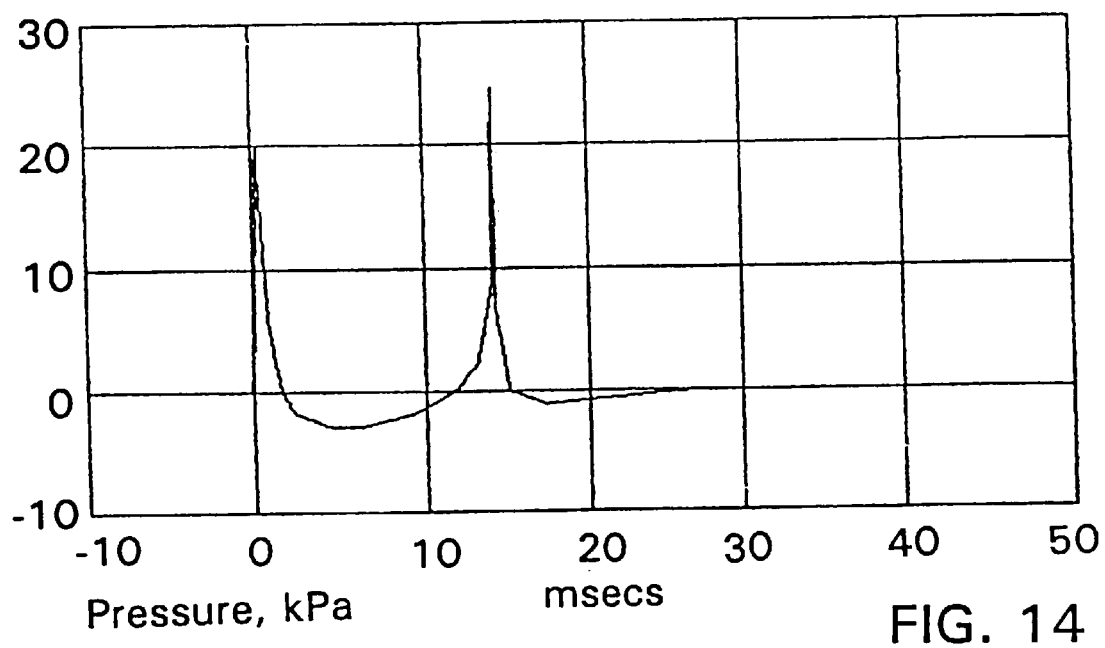
FIGS. 14 and 15 are similar to FIGS. 4A and 4C, and respectively illustrate the signature of a 19 KJ (kilo-Joule) spark discharge source or sparker at 100 and 276 feet below the water surface, respectively.
Figure 16:
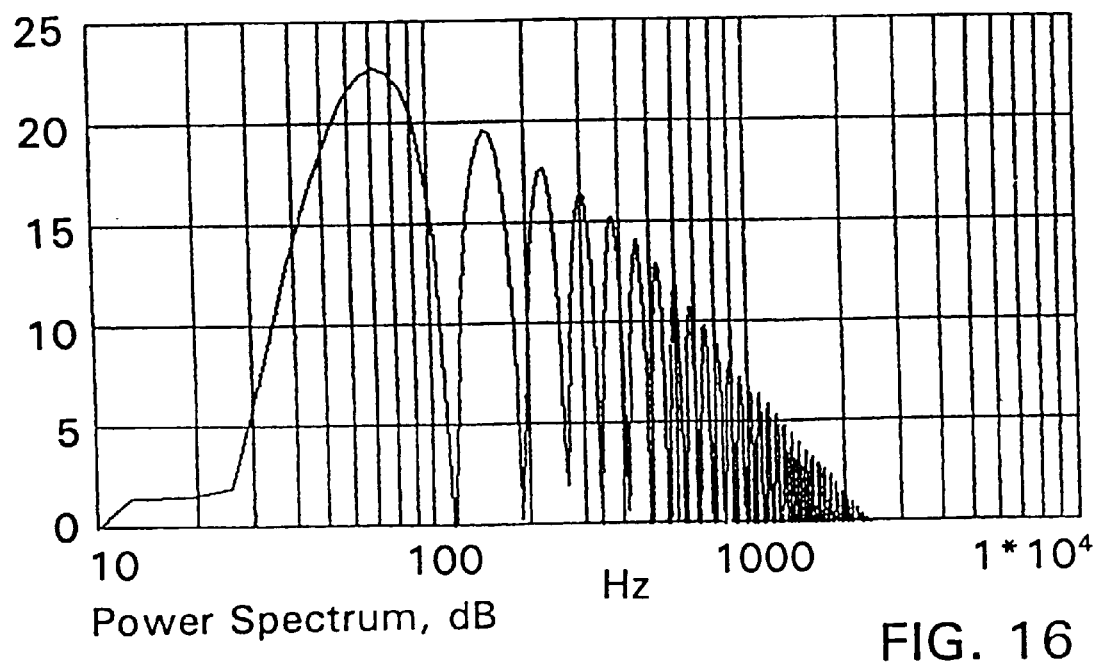
FIGS. 16 and 17 are similar to FIGS. 5A and 5C and show the spectra of the signatures of FIGS. 14 and 15.
Figure 15:
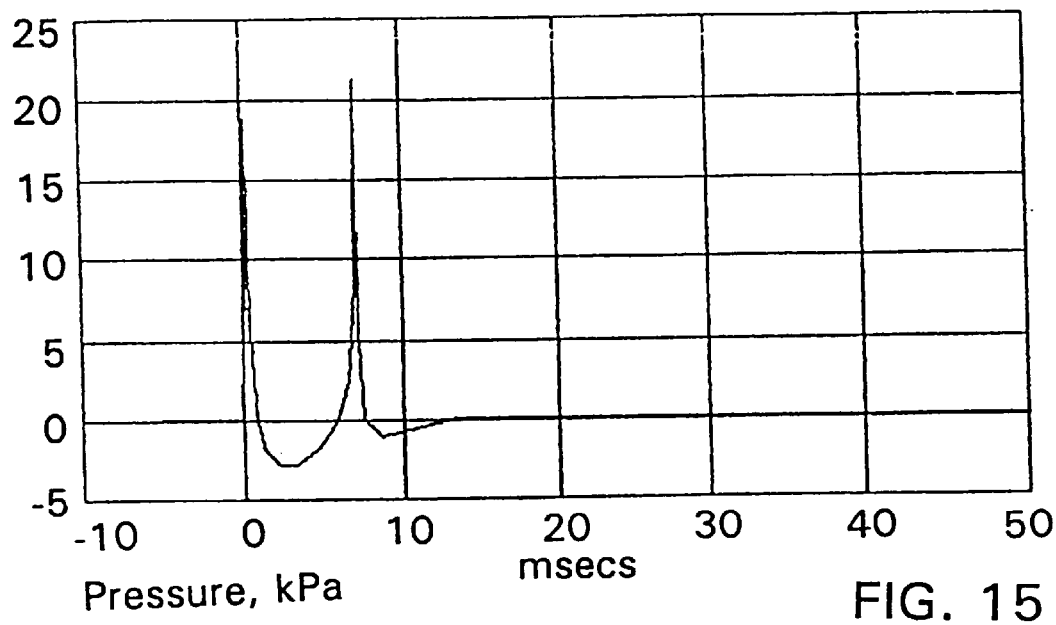
Figure 17:
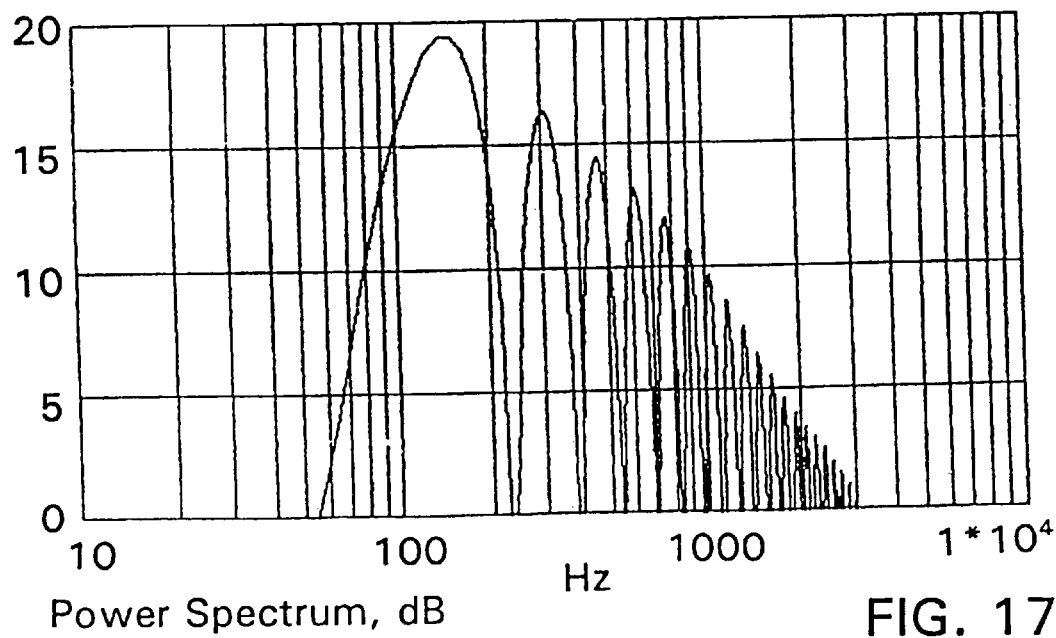
Figure 19:
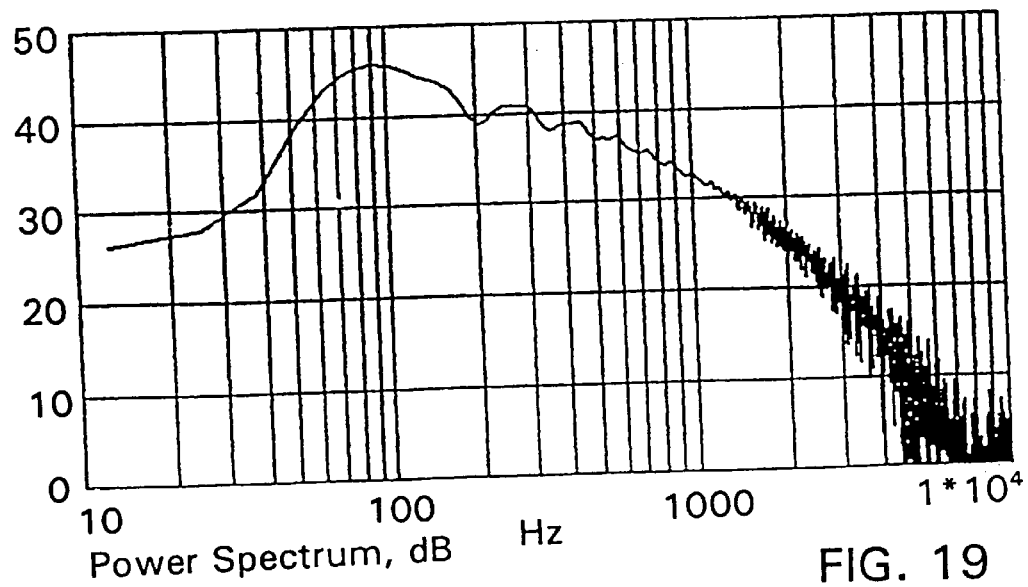
FIG. 19 is a plot showing the spectrum of the impulse signature of FIG. 18.

The spectrum of the composite pulse is shown in FIG. 19. This spectrum is smoothed and broadened relative to the individual event spectrum shown in FIG. 13, and is increased substantially in magnitude.

Figure 18:
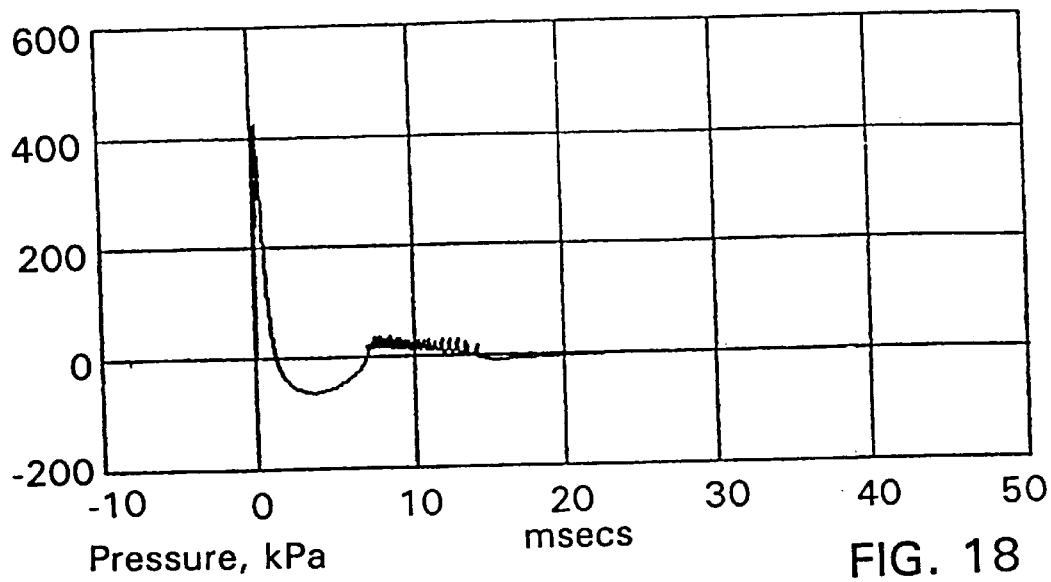
FIG. 18 is a plot showing the time signature in the far field of a vertical array of sparkers as a composite pulse, the plot being for an array of 23 sparkers spaced 8 feet apart and extending over an depth range from 100 to 276 feet, with the time signature being defined in the far field at the mid-depth of the array, or at 188 feet.

The singular impulse event of FIG. 18 and its broadened spectrum of FIG. 19 creates an ideal broadband interrogation pulse for underwater object detection at long range.

Figure 20:
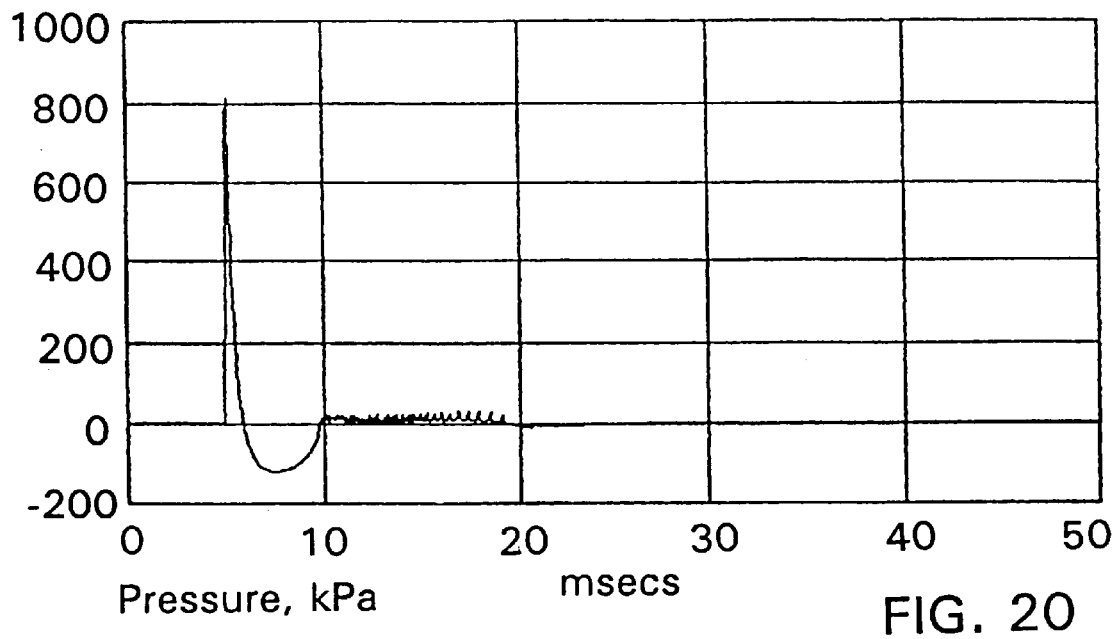
FIGS. 20 and 21 are, respectively, plots of the signature and spectrum of another array, specifically an array of 46 sparkers extending over a length of 360 feet from a depth of 100 to 466 feet.
Figure 21:
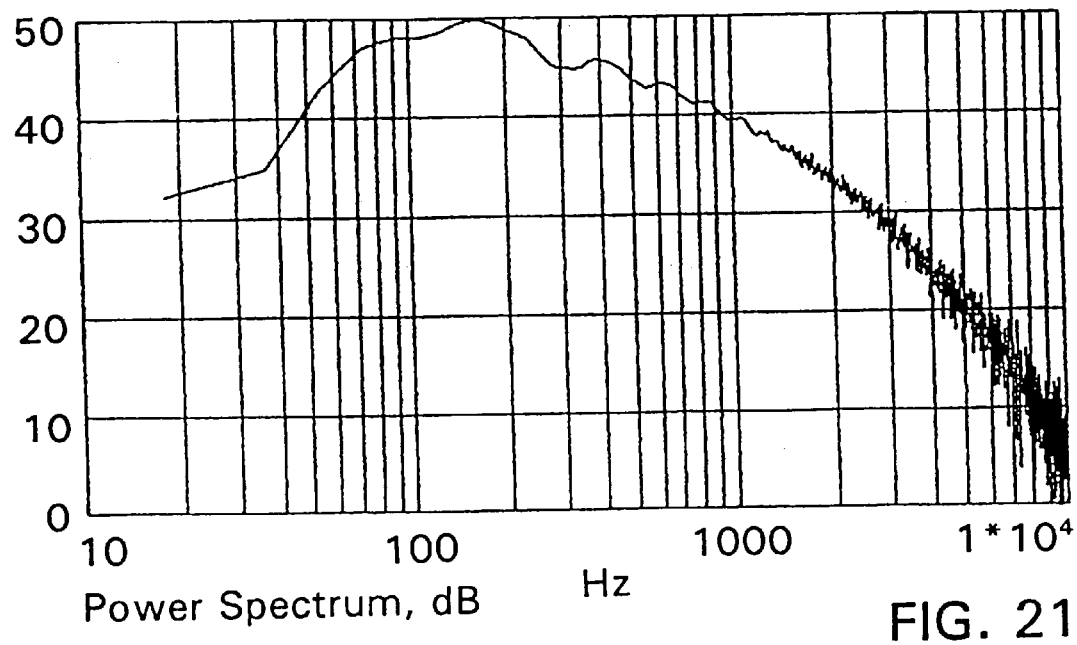

FIG. 20 and 21 illustrate the results for a larger array. This array includes double the number of sparker units (46) and extends over a length of 360 feet (from 100 to 460 feet).

As can be seen in FIG. 20, the impulse is approximately doubled in amplitude and better defined, and the spectrum of FIG. 21 is raised in amplitude, especially at the high end, and broadened.

FIG. 22 is a block diagram of the system showing a high voltage DC generator feeding an energy storage bank, which may be a bank of high-voltage capacitors.

The energy storage bank is connected, via individual high voltage switching circuits to the sparker electrodes distributed along the vertical array. The electrical pulses may be provided via the switching circuits substantially simultaneously to create a broadside acoustic transmission, or may be sequentially delayed in time to steer the main beam of the array up or down. The voltage may be in the range of, for example, 5 to 10KV. The interconnecting cables to the electrodes may each have a high voltage conductor and an integral ground return, or the ground return may pass through the seawater to a common connection.

Alternatively the energy storage bank and switching circuits may be configured underwater, and distributed along the array so as to provide a close connection between the source of energy and its point of release into the environment. Although this distributed configuration may lead to system complexity, its advantage may reside in improved timing of the individual discharge events which maybe important if focus resides on the higher frequency portions of the composite transmitted impulse spectrum.

The foregoing description of an exemplary system and of exemplary arrays should be taken as illustrative and not limiting upon the invention.

I claim:

1. A system for generating and transmitting acoustic signals under water which comprises a vertical array of spaced sources extending over a sizable depth range, which sources are either all air guns or all spark discharge devices, each of said guns possessing a gas charge chamber of the same or similar size for the storage of compressed gas under high pressure, each of said spark discharge devices being of substantially equal energy rating or size, said volume of compressed gas in each of said guns and energy from said spark discharge devices being explosively released upon command of a control signal from a source controller to provide a vertical distribution of gas or water vapor filled cavities, said explosive release resulting in an initial positive acoustic impulse from each source followed by a negative going undulation whose period is related to the depth of the respective cavities, said vertical distribution of cavities forming a stagger-tuned array of cavities whose decaying oscillations creates a sensibly broad spectral pedestal extending in period from the period of the acoustic oscillations from the upper-most cavity in the array to the period of the acoustic oscillations of the lower-most cavity in the array.

2. The system of claim 1 having at least 30 air guns and a length of at least 60 feet.

3. The system of claim 1 in which said gas volumes of the individual air guns in said array are of the same size.

4. The system of claim 3 in which said same size is in the range of five cubic inches to 100 cubic inches.

5. The system of claim 1 in which the vertical spacing of the air gun ports or the explosive chart release ports is approximately two feet.

6. The system of claim 1 wherein said array is one of a plurality of sub-arrays, each of which are disposed essentially vertically and in overlapping and interleaved relationship, each of said sub-arrays consisting of a plurality of said sources, said sources in different ones of said arrays being of equal energy or size, but different from the energy or size produced by the sources in the others of said arrays.

7. The system of claim 1 wherein said source controller controls the firing times of the individual guns or sparkers to be essentially concurrent.

8. The system of claim 1 wherein said source controller provide a plurality of control signals either concurrently so as to generate and transmit said acoustic impulse which is directed horizontally and omnidirectionally or with predetermined timing to provide selective vertical directionality.

9. The system according to claim 1 wherein the spacing of said sources in said array is of such amount as to promote the independent, free oscillation of said cavities. without significant interaction therebetween, thereby to enhance the pedestal spectral amplitude as well as the total acoustic energy output of said vertical array.

10. A system for generating and transmitting acoustic signals under water which comprises a vertical array of spaced air guns, each of said guns possessing a gas chamber of the same or similar size, said volume of compressed gas in each of said chambers being explosively released upon command of a control signal from a gun controller to provide a vertical distribution of resonant gas-filled cavities, said explosive release resulting in an initial positive acoustic impulse from each gun followed by a secondary decaying bubble oscillation whose oscillatory period is related to the depth of the respective gas-filled cavity, said vertical array of gas cavities forming a stagger-tuned array of resonant cavities whose decaying oscillations create a sensibly broad spectral pedestal extending in frequency from the resonant frequency of the upper-most cavity in the array to that. of the resonant frequency of the lower-most cavity in the array.

11. The system of claim 1 or 10 in which said command of said control signals is issued simultaneously.

* * * * *